United States Patent Office 2,922,775
Patented Jan. 26, 1960

2,922,775

PROCESS FOR POLYMERIZING A VINYLIDENE MONOMER IN AN INERT ORGANIC SOLVENT AND WITH CERTAIN REACTIVE REDUCING AGENTS

Guido Mino, Plainfield, and Samuel Kaizerman, North Plainfield, N.J.

No Drawing. Application March 19, 1957
Serial No. 646,976

18 Claims. (Cl. 260—45.5)

This invention relates to a process for polymerizing a vinyl and/or vinylidene compound in an inert organic solvent in the presence of a ceric salt, which is soluble in at least one component of the reaction medium, and an organic reducing agent which is capable of being oxidized by said ceric salt and which is capable of initiating the polymerization.

One of the objects of the present invention is to produce polymeric materials by polymerizing a polymerizable compound containing a polymerizable $CH_2=C<$ group in an inert organic solvent in the presence of ceric salts and certain organic reducing agents. A further object of the present invention is to produce polymerization interreaction products in an inert organic solvent comprising the polymerization interreaction product of a polymerizable vinyl and/or vinylidene monomer and certain organic reducing agents by the use of selected ceric salts. These and other objects of the present invention will be discussed in greater detail hereinbelow.

Among the monomeric polymerizable compounds which may be used in the practice of the process of the present invention are those containing a polymerizable $CH_2=C<$ group. This includes vinylidene compounds and/or vinyl compounds. More specifically, the following polymerizable monomers may be used: styrene, and substituted styrenes such as ring-substituted and side-chain substituted styrenes, e.g., α-chlorostyrene, α-methyl styrene, and the like, o-methylstyrene, m-methylstyrene, p-methylstyrene, 2,4-dimethylstyrene, 2,5-dimethylstyrene, 2,4,5-trimethylstyrene, p-ethylstyrene, o-bromostyrene, 2-bromo-4-ethylstyrene, p-isopropylstyrene, p-chlorostyrene, 2,4-dichlorostyrene, or polymerizable acrylic compounds such as acrylic acid and its homologues such as methacrylic acid, α-chloroacrylic acid and the like and derivatives thereof such as the anhydrides, amides and nitriles, and the acrylic type acid esters of monohydric alcohols such as the methyl, ethyl, propyl, butyl, isobutyl, amyl, hexyl, cyclohexyl, heptyl, octyl, decyl alcohols or the acrylic type acid esters of nitro alcohols such as 3-nitro-2-butanol, 2-nitro-3-hexanol, 2-methyl-2-nitro-1-butanol and 2-nitro-2-methylpropyl alcohol, and the acrylic type acid esters of polyhydric alcohols such as ethylene glycol, diethylene glycol, glycerol, pentaerythritol, dipentaerythritol, propylene glycol, dipropylene glycol and the like. Additionally, one may make use of such polymerizable monomers such as butadiene, isoprene, and haloprenes such as chloroprene. Still further, as the polymerizable monomer, one may use allyl compounds, such as allyl alcohol or allyl or substituted allyl esters such as methallyl esters. More specifically, one may use allyl acetate, allyl propionate, allyl chloroacetate, allyl caproate, allyl linoleate, allyl benzoate, methyllyl acetate, the allyl ester of isobutyric acid, allyl acrylate, diallyl carbonate, diallyl oxalate, diallyl phthalate, diallyl maleate, triallyl cyanurate and the like. Still further, one may make use of the vinyl or vinylidene esters such as vinyl acetate, vinyl chloride, vinylidene chloride, vinyl propionate, vinyl butyrate, and the like. Vinyl ethers may also be used such as vinylethylether, vinylpropylether, vinylisobutylether and the like or other vinyl compounds such as divinylsulfone, divinylsulfide, vinylpyridine and the like. Additionally, one may make use of the unsaturated polymerizable amides such as acrylamide, methacrylamide, and the like, or the nitriles such as acrylonitrile, methacrylonitrile, ethacrylonitrile, alpha-chloroacrylonitrile and the like. Whenever desirable, these polymerizable monomers may be used either singly or in combination with one another.

In the practice of the present invention, one makes use of an organic reducing agent which is capable of being oxidized by the ceric salt which is present in the system and which is capable of initiating the polymerization of the compound containing the $CH_2=C<$ group. These reducing agents may be either monomeric or polymeric. Fundamentally, these reducing agents may be an aldehyde, a mercaptan, a primary amine, a glycol, a carboxylic acid, a keto acid, or a derivative of a keto acid.

Among the aldehydes which may be used in the practice of the process of the present invention are formaldehyde, paraformaldehyde, acetaldehyde, propionaldehyde, valeraldehyde, heptanal or polymeric aldehydes such as paraldehyde, polyacrolein, poly-3-butenal, poly-3-pentenal, poly-5-chloro-3-pentenal, or copolymers prepared by polymerizing acrolein, 3-butenal, 3-pentenal, 5-chloro-3-pentenal and the like with other polymerizable materials containing the $CH_2=C<$ group such as those recited hereinabove.

Among the mercaptans which may be used in the practice of the process of the present invention are methyl mercaptan, ethyl mercaptan, n-propyl mercaptan, isopropyl mercaptan, 2-mercaptobutane, n-butyl mercaptan, n-decyl mercaptan, lauryl mercaptan, phenylethyl mercaptan, tertiary butyl mercaptan, tertiary amyl mercaptan, tertiary octyl mercaptan and the like. As polymeric reducing agents, one may make use of such polymeric mercaptans as polymercaptoethylacrylate, polymercaptobutylacrylate, polymercaptoethylmethacrylate, polymercaptopropylacrylate, polymercaptopropylmethacrylate, or copolymers of mercaptoethylacrylate, mercaptobutylacrylate, mercaptoethylacrylate, mercaptopropylacrylate, mercaptopropylmethacrylate and the like, with other polymerizable materials containing a polymerizable $CH_2=C<$ group as recited hereinabove.

Among the primary amines which may be used in the practice of the process of the present invention are methylamine, ethylamine, propylamine, butylamine, octylamine, laurylamine, octadecylamine, ethylenediamine, or polymeric amines such as trimethylenediamine, diethylenetriamine, tetraethylene pentamine, triethylene tetramine, hexamethylene tetramine, or the reaction products of any of the polyamines set forth hereinabove and the like, with a difunctional halohydrin such as epichlorohydrin, epibromohydrin, epiiodohydrin, epifluorohydrin; alpha, alpha' - dichlorohydrin; alpha,alpha' - dibromohydrin; alpha,alpha' - diiodohydrin; alpha,alpha' - difluorohydrin and the like.

Among the glycols which may be used in the practice of the process of the present invention are those which have hydroxy groups on vicinal carbon atoms such as ethylene glycol, 1,2-propylene glycol, pinacol, 1,2-butanediol, 2,3-butanediol, 3,4-hexanediol; 1,2-octanediol; phenyl ethylene glycol; 3-chloropropanediol-1,2; 2-methylpropanediol-1,2; 4-nitrobutanediol-1,2. Among the polymeric glycols having hydroxy groups on vicinal carbon atoms which may be used in the practice of the process of the present invention are polymers of glycerol monoacrylate, glycerol monomethacrylate, glycerol monoethacrylate, glycerol mono-chloroacrylate and the like.

Among the carboxylic acids which may be used in the practice of the process of the present invention are the monocarboxylic acids and the polycarboxylic acids such as acetic acid, propionic acid, butyric acid, lauric acid, caproic acid, caprylic acid, capric acid, myristic acid, pimelitic acid, stearic acid, arachidic acid, behenic acid, lignoceric acid, myristoleic acid, palmitoleic acid, oleic acid, linoleic acid, linolenic acid, oleostearic acid, licanic acid, ricinoleic acid, erucic acid, maleic acid, fumaric acid, aconitic acid, itaconic acid, malonic acid, succinic acid, glutaric acid, sebacic acid, adipic acid, pimelic acid, suberic acid, azaleic acid, tricarballylic acid, citric acid, tartaric acid, malic acid and the like.

Among the polymeric acid reducing agents which may be used in the practice of the process of the present invention are copolymers of alpha, beta-ethylenically unsaturated monocarboxylic or polycarboxylic acids, and when available, the anhydrides thereof, with polymerizable monomeric materials devoid of carboxylic acid groups. Among the alpha, beta-ethylenically unsaturated carboxylic acids which may be used are acrylic acid, methacrylic acid, ethacrylic acid, crotonic acid, maleic acid, fumaric acid, aconitic acid, itaconic acid and the like. These acids may be copolymerized to form a polymeric acid reducing agent with such polymerizable compounds as styrene, and the substituted styrenes such as listed hereinabove, vinyl acetate, methyl vinyl ether, the acrylates such as methyl acrylate, ethyl acrylate, methyl methacrylate, ethyl methacrylate, butadiene and the like.

Among the keto acids which may be used in the practice of the process of the present invention are acetoacetic acid; 3-oxopentanoic acid; 2-methyl-3-oxopentanoic acid; 3-oxohexanoic acid; 2-ethyl-3-oxohexanoic acid; 3-oxo-3-phenylpropanoic acid; 3-oxo-5-chlorohexanoic acid.

Among the keto acid derivatives which may be used are methyl acetoacetate, ethyl acetoacetate, n-butyl-3-oxopentanoate, benzyl acetoacetate, acetoacetanilide, acetoacetamide, N-acetoacetyl-o-chloroaniline, acetyl acetronitrile, 3-oxohexanenitrile.

These reducing agents, whether monomeric or polymeric, may be used either singly or in combination with one another whether they be of the same class or of different classes. For instance, one may make use of two or more aldehydes, two or more mercaptans, or one may make use of one or more primary amines with one or more glycols and/or one or more keto esters and the like.

The amount of reducing agent used in the practice of the process of the present invention may be varied over a very substantial range such as from about 0.01% to about 1000% or even more by weight based on the total weight of monomer and preferably from about 1% to about 300% by weight based on the total weight of the polymerizable monomer of polymeric reducing agent. When the monomeric reducing agents are used, even lesser amounts may be employed as a preferred embodiment such as from 0.01% to about 100% and preferably from about 0.1% to about 10% by weight based on the weight of the polymerizable monomer.

The amount of ceric salt which is utilized in the practice of the process of the present invention may be varied over fairly wide limits, for example, one may utilize from about $10^{-6}$ to about $10^{-1}$ mol of ceric ion per mol of polymerizable monomer. Preferably, one would use between about $10^{-3}$ to $10^{-2}$ mol of ceric ion per mol of polymerizable monomer. Among the ceric salts which may be used in the practice of the process of the present invention are ceric nitrate, ceric sulfate, ceric ammonium nitrate, ceric ammonium sulfate, ceric ammonium pyrophosphate, ceric iodate or the ceric salts of organic acids such as ceric naphthenate, ceric linoleate, ceric dihexyl sulfosuccinate, ceric dioctyl sulfosuccinate, ceric diheptyl sulfoglutarate, ceric dodecyl sulfosuberate, ceric dilauryl sulfosebacate, ceric diamyl sulfomaleate, ceric dimethyl sulfofumarate, ceric dibutyl sulfodimethyl succinate, ceric dilauryl sulfomethyl glutarate and comparable organic ceric salts which may be produced by reacting ceric ammonium nitrate with sodium salts of organic sulfur containing acids, either monobasic or polybasic, saturated or unsaturated, aliphatic or aromatic such as the mono and disulfosuccinic acids, sulfochlorsuccinic acid, sulfoadipic acid, sulfopyrotartaric acid, sulfoglutaric acid, sulfosuberic acid, sulfosebacic acid, sulfomaleic acid, sulfofumaric acid, sulfodimethyl succinic acid, sulfomethyl glutaric acid, sulfopalmalinic acid, sulfopropylsuccinic acid, sulfooctylglutaric acid, or the alkyl esters of these sulfocarboxylic acids such as the methyl, ethyl, propyl, butyl, amyl, hexyl, octyl esters and the like. Additionally, organic ceric salts may be prepared by reacting ceric ammonium nitrate with the monoalkyl esters of sulfuric acid such as monobutyl acid sulfate, monoamyl acid sulfate, monooctyl acid sulfate, monolauryl acid sulfate and the like. Additionally, one may prepare organic ceric salts of the alkyl benzene sulfonic acids such as octyl benzene sulfonic acid, phenyl benzene sulfonic acid, decyl benzene sulfonic acid, dodecyl benzene sulfonic acid, octadecyl benzene sulfonic acid, isopropylnaphthalene sulfonic acid, and the like. In the preparation of the organic ceric salts, the organic sulfur containing acid materials are preferably used as alkali metal salts in reaction with the ceric ammonium nitrate to form the organic oil-soluble ceric salts. The preferred alkali metal is sodium, although others such as potassium, lithium and the like may be used. These organic oil-soluble organic salts are disclosed in considerable detail in our copending U.S. application having the Serial No. 628,212, filed December 14, 1956, of which the instant application is a continuation-in-part. In that application, we have disclosed and claimed a process for polymerizing vinyl and/or vinylidene monomeric materials in the presence of a ceric compound and an organic polymeric reducing agent in an aqueous media.

The process of the present invention is carried out in the presence of an organic solvent which is inert to the polymerization reaction taking place therein. Among the solvents which may be used advantageously are benzene, toluene, xylene, naphthalene, Varsol #1, Varsol #2, mineral spirits, P-1 ink oil, P-2 ink oil, deodorized petroleum solvent No. 590, deodorized petroleum solvent No. 470, No. 80 white oil (high boiling aliphatic hydrocarbons with low kauributanol values), see U.S. Patent No. 2,590,655, issued March 25, 1952, heptane, octane, kerosene and the like. The amount of solvent used is not critical and may be varied widely depending on the ultimate use of the polymeric material, the viscosity desired and the solids content of polymeric material therein. These solvents may be used either singly or in combination with one another.

The instant application is additionally a continuation-in-part application of our earlier filed U.S. application having the Serial No. 623,556, filed November 21, 1956, which discloses and claims a process for the polymerization of vinyl and/or vinylidene compounds in an aqueous medium in the presence of a ceric compound and certain monomeric organic reducing agents wherein the pH of the reaction system is maintained at 3.5 or below.

Each of these earlier cases are based on our parent application having the Serial No. 577,641, filed April 12, 1956, now abandoned, which disclosed and claimed the ceric ion polymerization of vinyl and/or vinylidene compounds in the presence of certain organic reducing agents.

In the practice of the process of the present invention, the conditions of reaction may be varied rather extensively, for instance, one may utilize temperatures from about −20° C. up to the boiling point of the system, namely, the reflux temperature, but it is desired for optimum results to avoid excessive thermal polymerization in favor of catalytic polymerization and, as a consequence, the preferred temperature range is between about +20° C. and about +60° C. Temperatures below 20° C. are effective but the polymerization time increases as the temperature diminishes. Pressure is not a factor in carrying out the instant process inasmuch as atmospheric pressure, super-atmospheric pressure or sub-atmospheric pressure may be utilized. Atmospheric pressure is preferred.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with thermometer and stirrer, there is introduced a solution of 5 parts of methyl methacrylate and 0.5 part of ethylacetoacetate in 15 parts of benzene. The chamber is flushed with carbon dioxide and then brought to 30° C. While maintaining the solution at this temperature, there is introduced 0.1 part of ceric dihexyl sulfosuccinate and with constant agitation, the system is held at about 30° C. for approximately 71 hours. The polymeric solution is poured into methanol in order to precipitate the polymer. The yield of polymer is 2.56 parts which represents a conversion of monomer to polymer of 51.2%. The above procedure was followed in all details except that the ethyl acetoacetate was omitted. The yield of polymer after 71 hours was 0.44 part which represented a conversion of monomer to polymer of 8.8%.

*Example 2*

Into a suitable reaction vessel equipped as before, there is introduced 3 parts of vinylidene chloride, 2 parts of methyl methacrylate and 0.5 part of propylene glycol dissolved in 15 parts of diethylether. The system is flushed with carbon dioxide and the temperature is brought to about 30° C. There is then added 0.1 part of ceric dihexyl sulfosuccinate and polymerization is carried out at about 30° C. for a period of 26 hours. The resulting polymer dispersion is poured into 100 parts of methanol and the precipitated polymer is collected by filtration. The yield of polymer is 1.34 parts and represents a conversion of monomer to polymer of 26.8%.

*Example 3*

Into a suitable reaction vessel equipped as before, there is introduced 5 parts of acrylonitrile, 15 parts of ethylether and 0.5 part of 1,2-propylene glycol. The system is flushed with carbon dioxide and brought to about 30° C. whereupon, there is added 0.1 part of ceric dihexyl sulfosuccinate and polymerization is carried out while maintaining the temperature at about 30° C. for a period of about 7 hours. The polymeric material produced represents a conversion of monomer to polymer of 16.1%. The procedure outlined above is follwed in every detail except that the 1,2-propylene glycol is omitted. After 7 hours, at 30° C., the conversion of monomer to polymer is 1.7%.

*Example 4*

Into a suitable reaction vessel equipped as before, there is introduced 5 parts of vinylidene chloride, 15 parts of diethylether and 0.5 part of n-butyric acid. The system is flushed with carbon dioxide and adjusted to about 30° C. whereupon, there is then added 0.1 part of ceric dihexyl sulfcsuccinate and the charge is maintained at about 30° C. for about 9 hours. Ultimate conversion of monomer to polymer is about 3.3%. The procedure outlined above is followed again in every detail except that the n-butyric acid is omitted. After 9 hours at 30° C., the conversion of monomer to polymer is 0%.

*Example 5*

Into a suitable reaction vessel equipped as before, there is introduced 5 parts of ethyl acrylate, and 0.5 part of acetaldehyde dissolved in 15 parts of methylethyl ketone. The system is purged by flushing with nitrogen gas. While maintaining the system at about 30° C., there is added 0.1 part of ceric diisobutyl sulfosuccinate. After polymerizing for about 20 hours at 30° C., the solution is poured into an excess of a 2:1 solution of hexane and methanol. The yield of polymer is 1.1 parts which represents a conversion of monomer to polymer of about 22%.

*Example 6*

Into a suitable reaction vessel equipped as before, there is introduced 10 parts of a mixture of o-, m- and p-methylstyrene and 0.5 part of dodecyl mercaptan dissolved in 10 parts of toluene. The system is flushed with nitrogen and there is then added 0.2 part of ceric dihexyl sulfosuccinate. The polymerization is then carried out with constant agitation for about 62 hours at 40° C. The unreacted monomer, reducing agent and solvent are then removed by distillation under vacuum. The yield of polymeric material is about 3.3 parts representing a conversion of monomer to polymer of about 33%.

*Example 7*

Into a suitable reaction vessel equipped as before, there is introduced 1 part of vinyl methyl ether-maleic anhydride copolymer dissolved in 8 parts of acetone. To this solution there is added 2 parts of acrylamide dissolved in 8 parts of acetone. The system is flushed with nitrogen and, there is then added 5 parts of a 0.01 N solution of ceric ammonium nitrate dissolved in acetone. The polymerization is carried out at about 25° C. for 75 minutes, during which time, the mixture forms a stiff, opaque gel. The gel is broken into small fragments which are then thoroughly dispersed in 200 parts of choloroform. The polymer is separated by filtration and dried in vacuo. The yield is 2.23 parts which represents a conversion of monomer to polymer of 61.5%. The resultant polymer is soluble in water but is insoluble in acetone.

The polymeric reaction products produced in accordance with the present invention will find applicability in a plurality of applications. For instance, one may use these polymeric reaction products as adhesives, molding compositions, laminating compositions, potting compositions or in the treatment of various materials such as in the treatment of textile materials made up of natural and/or synthetic fibers including wool, linen, cotton, nylon, and other synthetics produced from super-polyamides or polyesters, or in the treatment of paper or paper pulp or in the treatment of wood or leather. Additionally, these polymeric reaction products may be used to form synthetic fibers by use of a conventional extrusion technique. Films may be made from the polymeric reaction products of the present invention either of the self-supporting class or those which are bonded to a substrata as in the instance of coatings, paints and the like. Still further, these polymeric reaction products can be used in printing inks or in the insulation coating of wires and other electrical parts.

We claim:

1. A process comprising polymerizing a polymerizable monomeric compound containing a polymerizably reactive $CH_2=CH<$ group in an inert organic solvent in the presence of a ceric salt, which is soluble in at least one monomeric compound containing a polymeribazle reducing agent which is capable of being oxidized by said ceric salt and which is capable of initiating the polymerization.

2. A process comprising polymerizing a polymerizable monomeric compound containing a polymerizably reactive $CH_2=C<$ group in an inert organic solvent in the presence of a ceric salt, which is soluble in at least one component of the reaction medium, and a monomeric organic reducing agent which is capable of being oxidized by said ceric salt and which is capable of initiating the polymerization.

3. A process comprising polymerizing a polymerizable monomeric compound containing a polymerizably reactive $CH_2=C<$ group in an inert organic solvent in the presence of a ceric salt, which is soluble in at least one component of the reaction medium, and a monomeric glycol.

4. A process comprising polymerizing a polymerizable monomeric compound containing a polymerizably reactive $CH_2=C<$ group in an inert organic solvent in the presence of a ceric salt, which is soluble in at least one component of the reaction medium, and propylene glycol.

5. A process comprising polymerizing vinylidene chloride in an inert organic solvent in the presence of a ceric salt, which is soluble in at least one component of the reaction medium, and propylene glycol.

6. A process comprising polymerizing a polymerizable monomeric compound containing a polymerizably reactive $CH_2=C<$ group in an inert organic solvent in the presence of a ceric salt, which is soluble in at least one component of the reaction medium, and a monomeric primary amine.

7. A process comprising polymerizing a polymerizable monomeric compound containing a polymerizably reactive $CH_2=C<$ group in an inert organic solvent in the presence of a ceric salt, which is soluble in at least one component of the reaction medium, and n-butyl amine.

8. A process comprising polymerizing acrylonitrile in an inert organic solvent in the presence of a ceric salt, which is soluble in at least one component of the reaction medium, and n-butyl amine.

9. A process comprising polymerizing a polymerizable monomeric compound containing a polymerizably reactive $CH_2=C<$ group in an inert organic solvent in the presence of a ceric salt, which is soluble in at least one component of the reaction medium, and a monomeric mercaptan.

10. A process comprising polymerizing a polymerizable monomeric compound containing a polymerizably reactive $CH_2=C<$ group in an inert organic solvent in the presence of a ceric salt, which is soluble in at least one component of the reaction medium, and n-decyl mercaptan.

11. A process comprising polymerizing methyl styrene in an inert organic solvent in the presence of a ceric salt, which is soluble in at least one component of the reaction medium, and n-decyl mercaptan.

12. A process comprising polymerizing a polymerizable monomeric compound containing a polymerizably reactive $CH_2=C<$ group in an inert organic solvent in the presence of a ceric salt, which is soluble in at least one component of the reaction medium, and a polymeric carboxylic acid.

13. A process comprising polymerizing a polymerizable monomeric compound containing a polymerizably reactive $CH_2=C<$ group in an inert organic solvent in the presence of a ceric salt, which is soluble in at least one component of the reaction medium, and a maleic anhydride copolymer.

14. A process comprising polymerizing a polymerizable monomeric compound containing a polymerizably reactive $CH_2=C<$ group in an inert organic solvent in the presence of a ceric salt, which is soluble in at least one component of the reaction medium, and a copolymer of maleic anhydride and vinyl methyl ether.

15. A process comprising polymerizing acrylamide in an inert organic solvent in the presence of a ceric salt, which is soluble in at least one component of the reaction medium, and a copolymer of maleic anhydride and vinyl methyl ether.

16. A process comprising polymerizing a polymerizable monomeric compound containing a polymerizably reactive $CH_2=C<$ group in an inert organic solvent in the presence of a ceric salt, which is soluble in at least one component of the reaction medium and a polymeric aldehyde.

17. A process comprising polymerizing a polymerizable monomeric compound containing a polymerizably reactive $CH_2=C<$ group in an inert organic solvent in the presence of a ceric salt, which is soluble in at least one component of the reaction medium, and a copolymer of acrolein and acrylonitrile.

18. A process comprising polymerizing ethyl acrylate in an inert organic solvent in the presence of a ceric salt, which is soluble in at least one component of the reaction medium, and a copolymer of acrolein and acrylonitrile.

References Cited in the file of this patent

UNITED STATES PATENTS

| | | |
|---|---|---|
| 2,396,997 | Fryling | Mar. 19, 1946 |
| 2,416,461 | Stewart | Feb. 25, 1947 |
| 2,485,535 | Park | Oct. 18, 1949 |
| 2,594,560 | Howard et al. | Apr. 29, 1952 |

OTHER REFERENCES

Bovey et al.: "Emulsion Polymerization," pages 80–81, published by Interscience Pub., New York (1955).

Bacon: Trans. Faraday Soc., volume 42, pages 140–155 (1946).

UNITED STATES PATENT OFFICE
CERTIFICATE OF CORRECTION

Patent No. 2,922,775            January 26, 1960

Guido Mino et al.

It is hereby certified that error appears in the printed specification of the above numbered patent requiring correction and that the said Letters Patent should read as corrected below.

Column 1, line 66, for "methyllyl" read -- methallyl --; column 6, line 62, for "$CH_2=CH{<}$" read -- $CH_2=C{<}$ --.

Signed and sealed this 26th day of July 1960.

(SEAL)
Attest:

KARL H. AXLINE
Attesting Officer

ROBERT C. WATSON
Commissioner of Patents